(12) United States Patent
Williams

(10) Patent No.: US 6,955,602 B2
(45) Date of Patent: Oct. 18, 2005

(54) TEXT ENTRY WITHIN A VIDEO GAME

(75) Inventor: Roland E. Williams, Pleasant Hill, CA (US)

(73) Assignee: Zi Technology Corporation LTD, Hamilton (BM)

( * ) Notice: Subject to any disclaimer, the term of this patent is extended or adjusted under 35 U.S.C. 154(b) by 331 days.

(21) Appl. No.: 10/440,037

(22) Filed: May 15, 2003

(65) Prior Publication Data

US 2004/0229697 A1 Nov. 18, 2004

(51) Int. Cl.[7] .......................................... A63F 13/00
(52) U.S. Cl. ........................................ 463/31; 463/1
(58) Field of Search ............................... 463/31, 30, 1, 463/2, 3, 4, 5, 6, 7; 345/156, 25, 26; 700/102, 700/104

(56) References Cited

U.S. PATENT DOCUMENTS

| | | | |
|---|---|---|---|
| 5,008,847 A | 4/1991 | Laeyre | |
| 5,128,672 A | 7/1992 | Kaehler | |
| 6,669,562 B1 * | 12/2003 | Shiino | 463/31 |
| 2003/0130020 A1 * | 7/2003 | Bates et al. | 463/1 |
| 2004/0070567 A1 * | 4/2004 | Longe et al. | 345/156 |
| 2004/0080487 A1 * | 4/2004 | Griffin et al. | 345/156 |
| 2004/0186889 A1 * | 9/2004 | Washburn | 709/206 |
| 2004/0222964 A1 * | 11/2004 | Martinez et al. | 345/156 |

* cited by examiner

*Primary Examiner*—Jessica J. Harrison
(74) *Attorney, Agent, or Firm*—James D. Ivey; Ivey, Smith and Ramirez

(57) ABSTRACT

A user composes a message within a video game paradigm by hitting targets in the video game environment which are associated with message component candidates such as letters, words, and phrases. Each of the message component candidate has a relative likelihood of selection predicted according to language usage in general and specifically of the user and according to the context of any portion of the message already composed. Message component candidates which are more likely to be selected by the user are associated with targets or other objectives of the video game environment which are more easily achieved. For example, more likely message components are associated more frequently and more centrally located and slower moving targets.

45 Claims, 4 Drawing Sheets

TEXT ENTRY WITHIN A VIDEO GAME

FIELD OF THE INVENTION

This invention relates to the field of information entry in electronic devices, and more specifically to a mechanism which is entertaining, efficient, and intuitive to the user for entering information in a limited user input device such as a video game controller.

BACKGROUND OF THE INVENTION

The dramatic increase of popularity of the Internet has transformed many previously solitary activities to communal activities in which personal interaction is increasingly important. One such example is that of multi-player video games in which multiple players of video games play a single synchronized video game and compete with one another in a unified video game context. For example, many first-person shooter games have been transformed from solitary games in which a player virtually shoots at computer generated character targets to a multi-player game in which the targets are representations of other players—in other words, the character targets are not controlled by the computer but instead by other players.

As multi-player games grow in popularity, the desire to communicate with other players increases. However, game controllers—user input devices used in playing video games—are typically special purpose devices limited to a relatively small number of buttons and 2- or 3-dimensional directional controls or directional controls with additional dimensions. Thus, typical game controllers provide no convenient mechanism for entering textual messages to send to other players.

SUMMARY OF THE INVENTION

In accordance with the present invention, a user composes a message within a video game paradigm by hitting targets in the video game environment which are associated with message component candidates such as letters, words, and phrases. Each of the message component candidates has a relative likelihood of selection predicted according to language usage in general and specifically of the user and according to the context of any portion of the message already composed. Message component candidates which are more likely to be selected by the user are associated with targets or other objectives of the video game environment which are more easily achieved. For example, a video game environment can be a virtual three-dimensional space environment through which a virtual rocket is navigated and in which virtual weapons of the rocket are fired at objects moving through space wherein the objects are associated with respective message component candidates. Hitting an object with a virtual weapon causes the associated message component to be included in the message being composed.

More likely message component candidates are associated more frequently with objectives which are accessible to the user. For example, the letters "t" and "e" are relatively frequently used in the English language and therefore are more frequently associated with objects floating through the virtual three-dimensional space of the video game environment, and in particular that portion of the video game environment which is viewable by the user. Less commonly used letters, such as "q" and "z", are still associated with objects moving through the video game space, but less frequently.

Some characteristics of a video game objective which determines its degree of accessibility to the user include (i) location of the objective and (ii) the amount of time the objective remains in a location accessible to the user. In the illustrative example of the rocket navigating through space, more commonly used message components are more often associated with objects moving through a "sweet spot" of the viewable portion of the video game space—generally, central but slightly elevated and to the right from the user's perspective. In addition, more commonly used message components are more often associated with objects moving through the viewable portion of the video game space more slowly relative to the rocket such that those objects are more easily targeted and hit by virtual weapons of the rocket.

As the user hits objects with simulated weapons or navigates the virtual rocket to collide with the virtual objects in the video game space, the associated message components are thereby selected by the user and included in the message composed by the user. Such enables the user to generate messages using only the limited input devices typically used with video games and to enjoy the message composition itself.

DETAILED DESCRIPTION

Figure 1:
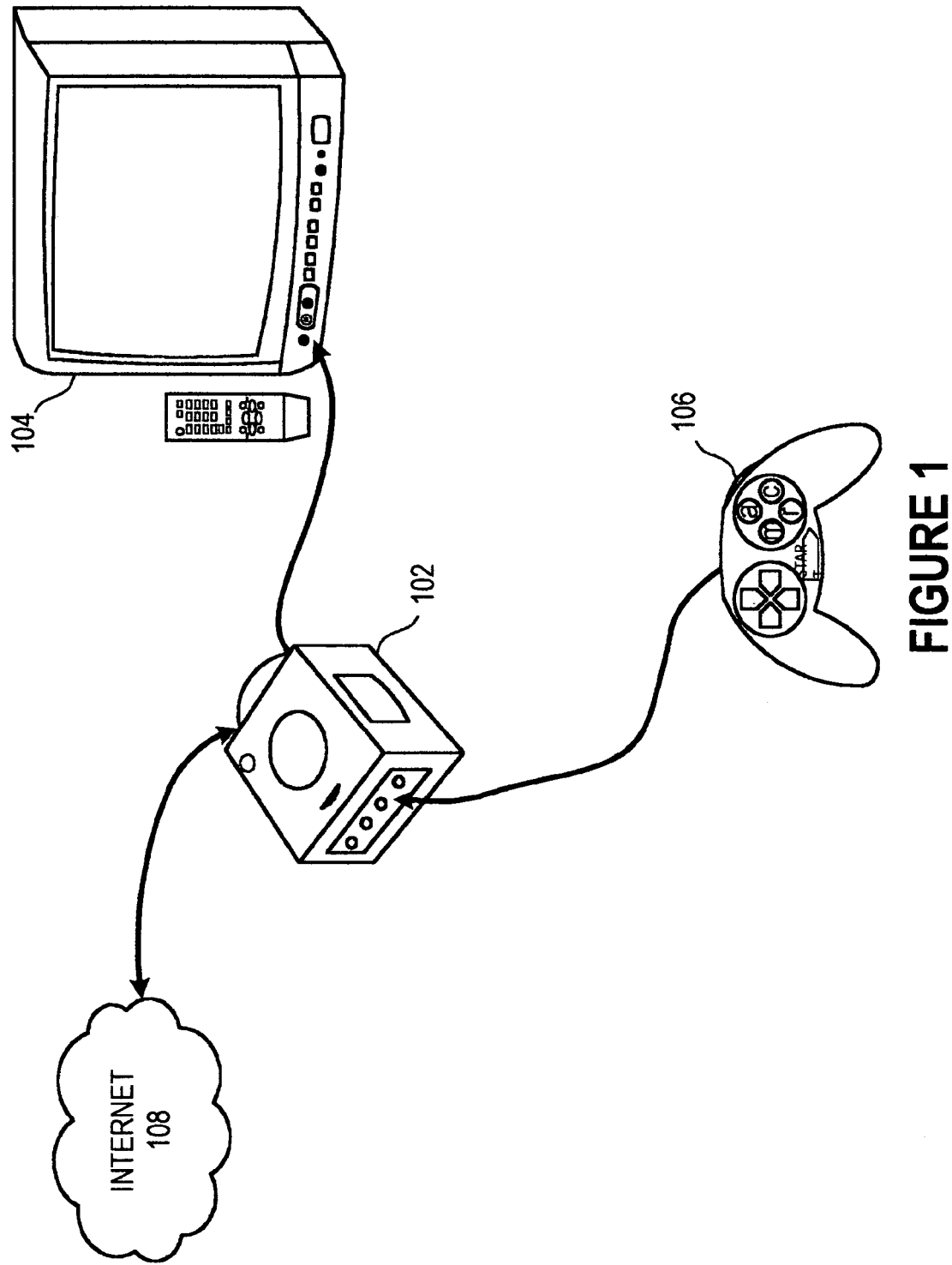
FIG. 1 is a block diagram showing a dedicated game playing computer coupled to a television, a game controller, and the Internet.

In accordance with the present invention, objectives such as targets 408–410 (FIG. 4) and targets 508 (FIG. 5) of video games are associated with message components which are selected by a user through conventional video game playing techniques to compose a message. The message components associated with video game objectives are generated according to respective likelihoods of each message component being selected next as determined by predictive analysis of a message under construction, e.g., message 404 (FIG. 4) or message 504 (FIG. 5).

Consider screen view 402 (FIG. 4) of construction of a message 404 in accordance with the present invention. A video game sequence includes a rocket 406 which is navigated by the user using conventional video game play techniques and in a manner described more completely below. Objectives of the video game text entry mechanism of FIG. 4 include letters 408, each of which is a candidate for being appended to message 404, and words 410, each of which is a candidate for automatic word-completion in message 404. The user selects letters 408 or words 410 for inclusion in message 404 by either flying the rocket through such letters and words or by firing simulated weapons of rocket 406 at such letters and words.

To assist the user in relatively efficient construction of message 404, objectives representing more likely selections of the user are positioned so as to be easier to select. Screen view 402 includes a "sweet spot" region 412, i.e., a region which is generally more central to the user's focus and therefore a more readily accessible region for the user. The most likely candidates for continuation of message 404 are made to appear within region 412. In this example, region 412 is slightly elevated and to the right of the center of screen view 402.

Figure 4:
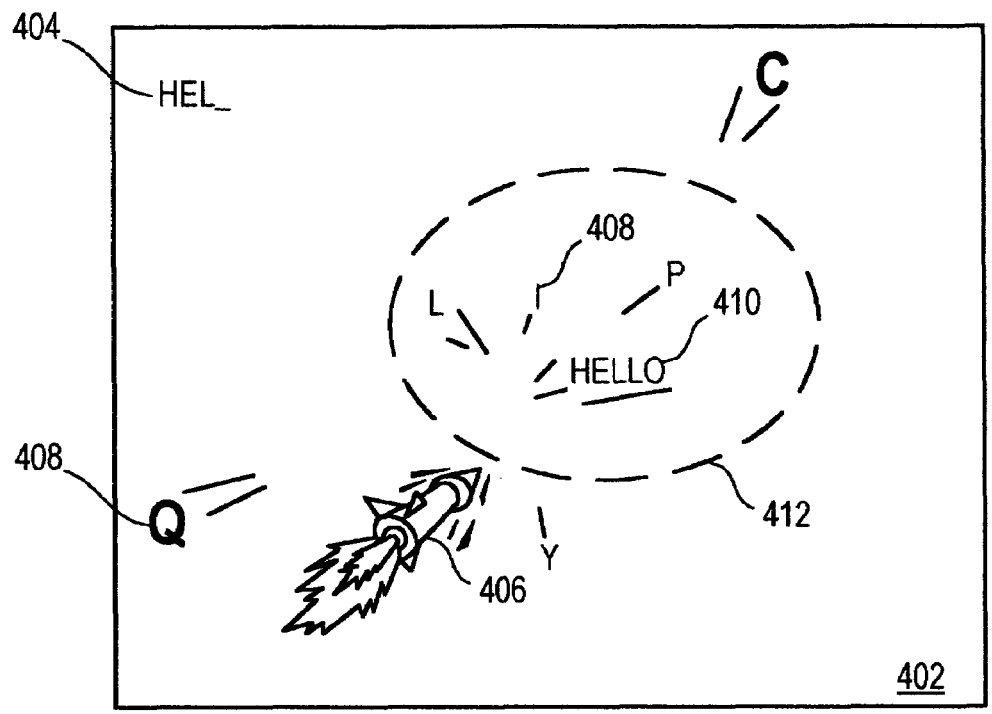
FIG. 4 is a screen view of composition of a message within a game environment in accordance with the present invention.
Figure 5:
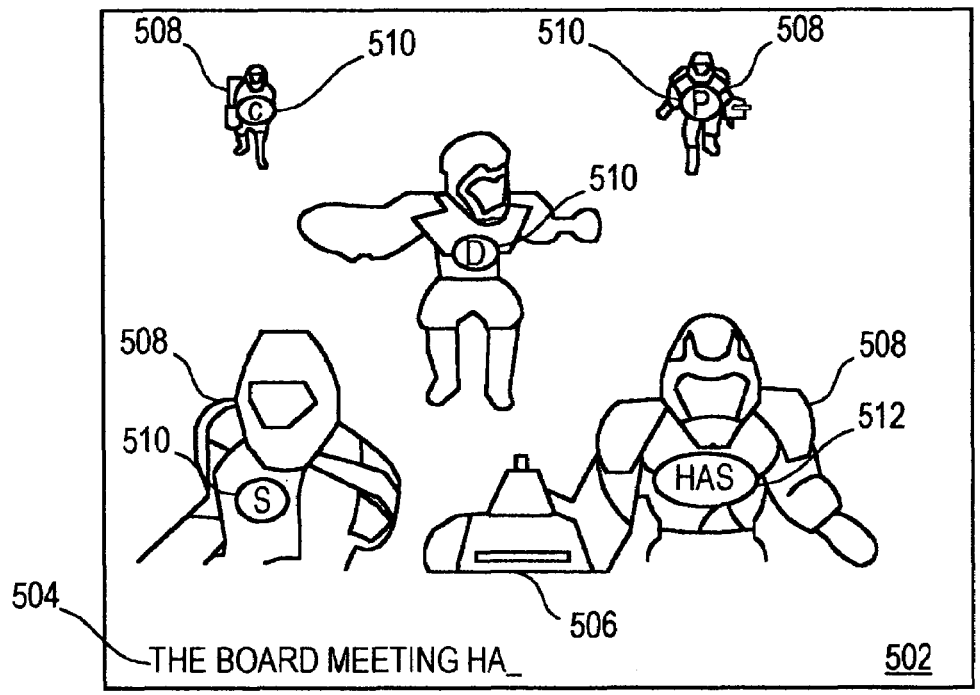
FIG. 5 is a screen view of composition of a message within an alternative game environment in accordance with the present invention.

In the illustrative example shown in FIG. 4, message 404 begins, "Hel . . . " According to predictive analysis which is described more completely below, likely candidates for the next letter include "1," "i," and "p." In addition, predictive analysis has determined that it is probable that the user intends to specify the word, "Hello." Accordingly, objectives 408 representing letter "l," "i," and "p" and an objective 410 representing the word "Hello" are presented to the user for selection in region 412.

It is possible that the user intends to append an unlikely candidate to message 404. Accordingly, unlikely candidates are also periodically presented to the user, albeit not as frequently as more likely candidates. To make the text entry interesting—as is expected by video game players—the location, trajectory, and timing of appearance of objectives 408–410 is randomized. However, more likely candidates are weighted such that their location is more likely within region 412, they tend to appear more frequently, and they tend to pass by rocket 406 more slowly. It's possible that a very likely candidate will appear outside of region 412 and pass very quickly relative to other objectives. However, such would be relatively unlikely due to probability weights given to likely candidates—likely candidates will more often appear frequently within region 412 and passing slowly. Conversely, unlikely candidates are weighted such that they tend to appear less frequently, tend to appear further outside region 412, and tend to pass more quickly.

Accordingly, the otherwise mundane task of typing a message to a competing user becomes a wild virtual flight through a meteor belt of letters and words in which the user composes a message by flying through such letters and words or by blasting them with virtual weapons of rocket 406.

FIG. 5 shows a similar text entry mechanism implemented in a different video game paradigm, namely, the now ubiquitous first-person shooter video game paradigm. Message 504 is analogous to message 404 (FIG. 4) and objectives 508 (FIG. 5) are virtual soldiers to be shot by the user with gun 506. Each objective 508 is associated with a letter 510 or a word 512. In the first-person shooter paradigm, objectives 508 don't move as quickly through screen view 502. Accordingly, to expedite composition of message 504, letters 510 and words 512 associated with each objective 508 change periodically. Variables of candidates which are randomized and weighted according to likelihood of selection by the user include (i) frequency of association with an objective 508, (ii) duration of association with an objective 508, and (iii) virtual proximity to the user of the objective 508 with which the candidate is associated. Accordingly, candidates which are more likely to be selected by the user tend to be associated more frequently and for longer durations with objectives 508 which appear closer to the user. From the user's perspective, unlikely letters and words appear less frequently, more briefly, and further away on the chests of objectives 508. The user appends selected letters 510 or words 512 by shooting the objective 508 on whose chest the selected letter or word appears.

Other video game paradigms can be used to associate message component candidates with game objectives. For example, automobile race games can have items on the road and the user can select message components associated with such items by driving through and/or over them. Such items can be, for example, items of trash lying in the street or simply graphical representations of the message component candidates themselves. Another example includes a skate park or snowboarding video game paradigm in which objectives can be rails, steps, jumps, ramps, etc.—skating or snowboarding trick objectives, each of which is associated with a respective candidate message component. Of course, exhaustive listing herein of all game paradigms with which message component candidates can be feasibly associated for message composition in accordance with the present invention is not practicable. It should be appreciated that the particular game paradigm in which message composition is embedded as described herein is not particularly central to the message composition mechanism described herein.

In this illustrative embodiment, screen views 402 and 502 are produced on a television 104 (FIG. 1) by a video game device 102. Video game device 102 is responsive to signals generated by a user by physical manipulation of a game controller 106. Video game device 102 is also capable of communication with other video game devices and other computers and/or electronic devices through a wide area network 108, which is the Internet in this illustrative embodiment.

Video game device 102 is a special purpose computer which plays video games in the form of computer programs. In alternative embodiments, video game device 102 can be generally any device which can be used for messaging and for video game play, such as a general purpose computer executing a video game program or a mobile computing device such as a personal digital assistant (PDA) or a mobile telephone with video game play capability. In such other embodiments, television 104 can be replaced by a display built into or otherwise associated with video game device 102.

Figure 2:
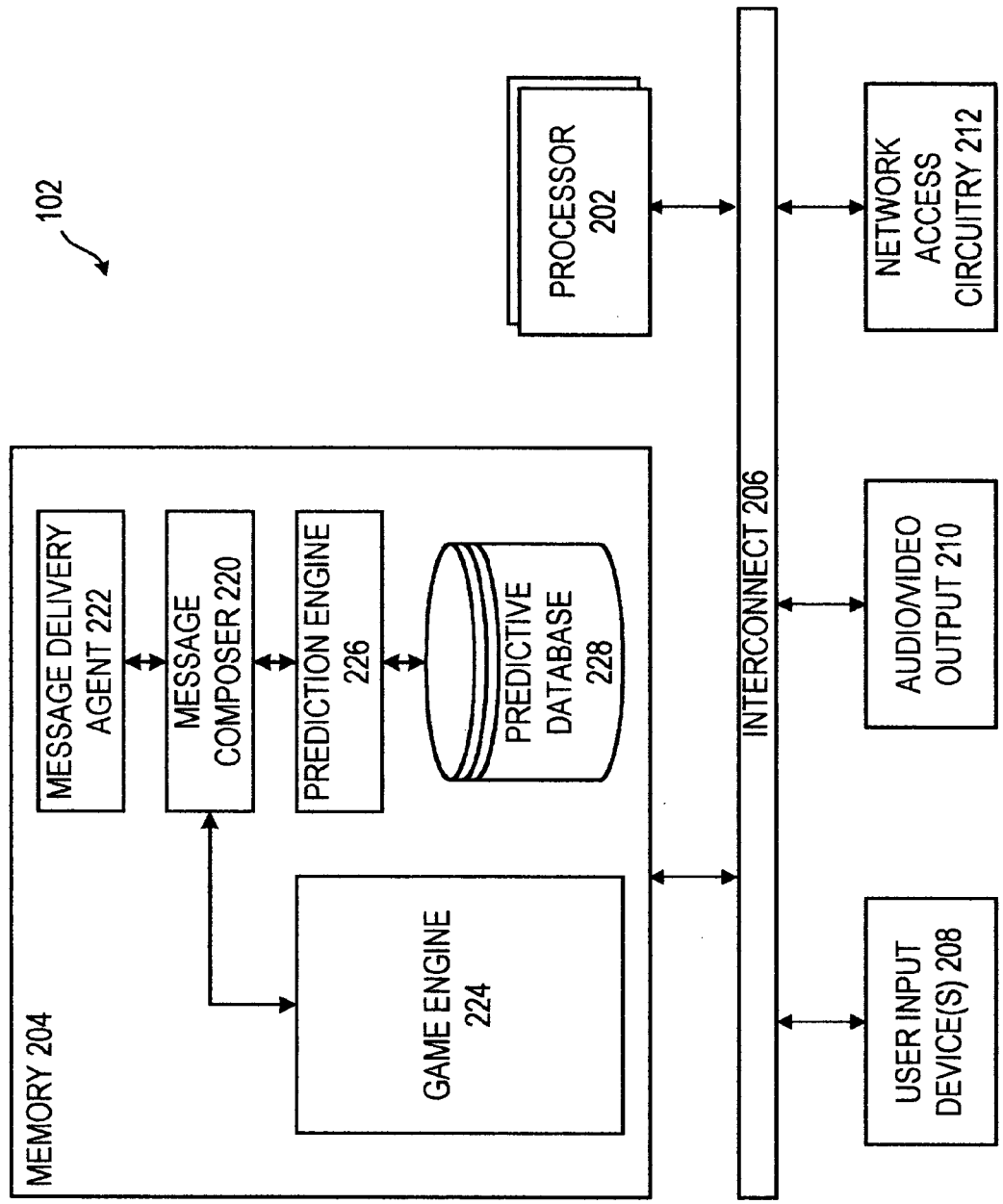
FIG. 2 is a block diagram of the dedicated game playing computer showing configuration of the computer for message composition in accordance with the present invention.

Video game device 102 is of the same architecture as most computers available today and is shown in greater detail in FIG. 2. Video game device 102 includes one or more microprocessors 202, each of which retrieves data and/or instructions from memory 204 and executes retrieved instructions in a conventional manner. Memory 204 can include generally any type of computer-readable memory such as randomly accessible memory (RAM), read-only memory (ROM), and persistent storage media such as magnetic and/or optical disks. Video games are typically published in the form of removable storage media such as optical disks or memory cartridges and memory 204 includes any devices which are capable of accessing such removable storage media and any such removable storage media itself.

Microprocessor 202 and memory 204 are connected to one another through an interconnect 206 which is a bus in this illustrative embodiment. Interconnect 206 is also connected to one or more user input devices 208, one or more output devices 210 (FIG. 2), and network access circuitry 212. Input devices 208 include, for example, game controller 106 (FIG. 1). Output devices 210 include television 104 (FIG. 1). Network access circuitry 212 can be generally any network connection such as a modem or any type of ethernet network adapter for example.

Memory 204 includes a message composer 220, a message delivery agent 222, a game engine 224, a prediction engine 226, and a predictive database 228. In this illustrative embodiment, message composer 220, message delivery agent 222, game engine 224, and prediction engine 226 are each all or part of one or more computer processes executed by processors 202 from memory 204. Predictive database 228 is a collection of organized data which is accessible by prediction engine 226.

Message composer 220 provides an interface by which a user of video game device 102 can compose messages for delivery to another user through Internet 108. Message delivery agent 222 implements a message delivery protocol by which the composed message is delivered to the other user. Examples of messages delivery protocols include the known short message service (SMS), simple mail transport protocol (SMTP), post office protocol (POP), Internet message access protocol (IMAP), and various instant messaging protocols that are currently available.

Game engine 224 provides a video game user interface framework in which message composer 220 can interact with the user to compose a message in a video game context. In the illustrative context of screen view 402 (FIG. 4), game engine 224 processes the movement of rocket 406, letters 408, and words 410 through a simulated three-dimensional space environment. Game engine 224 controls such simulated movement in accordance with signals received from game controller 106 in response to physical manipulation by the user. In addition, game engine 224 controls simulation of weapons firing from rocket 406 in accordance with such signals received from game controller 106. Game engine 224 also simulates dramatic explosion of letters 408 and words 410 upon successful selection of such letters and words, e.g., either by hitting them with a simulated weapon or by flying rocket 406 through them.

In the illustrative context of screen view 502 (FIG. 5), game engine 224 renders and simulates motion of objectives 508 in the form of humanoid soldiers in futuristic body armor. Game engine 224 also processes three-dimensional projections and view transformation in accordance signals received from game controller 106—such as turning left or right and moving forward or backward. As letters 510 or words 512 are selected by the user, e.g., by shooting the associated one of objectives 508. Upon successful shooting of an objective 508 by the user, game engine 224 renders simulation of the shot objective dying a particularly agonizing death—preferably with significant blood and gore and, in some embodiments, simulation of spontaneous humanoid combustion.

Prediction engine 226 (FIG. 2) analyzes any previously specified letters and/or words of a message being composed to predict likely candidates for subsequent letters to be appended to the message by the user and/or candidates for word-completion. In the illustrative context of screen view 402 (FIG. 4), message 404 includes the text, "Hel," and prediction engine 226 has selected as likely candidates the letters, "l," "i," and "p" and has determined that a likely word intended by the user is "Hello." Similarly, in the illustrative context of screen view 502 (FIG. 5), message 504 includes the text, "The board meeting ha," and prediction engine 226 has selected as likely candidates the letters, "d" and "s" and has determined that a likely word intended by the user is "has."

Predictive database 228 is used by prediction engine 226 to both determine and assess relative likelihoods of potential candidates of intended letters and word completions. In one embodiment, prediction engine 226 uses predictive database 228 to assess relative likelihoods of potential candidates of intended letters and word completions in the manner described in commonly-owned and copending U.S. patent application Ser. No. 10/360,537 filed Jan. 14, 2003 by Roland E. Williams and Robert B. O'Dell and entitled "Text Entry Mechanism for Small Keypads" and such description is incorporated herein by reference.

Figure 3:
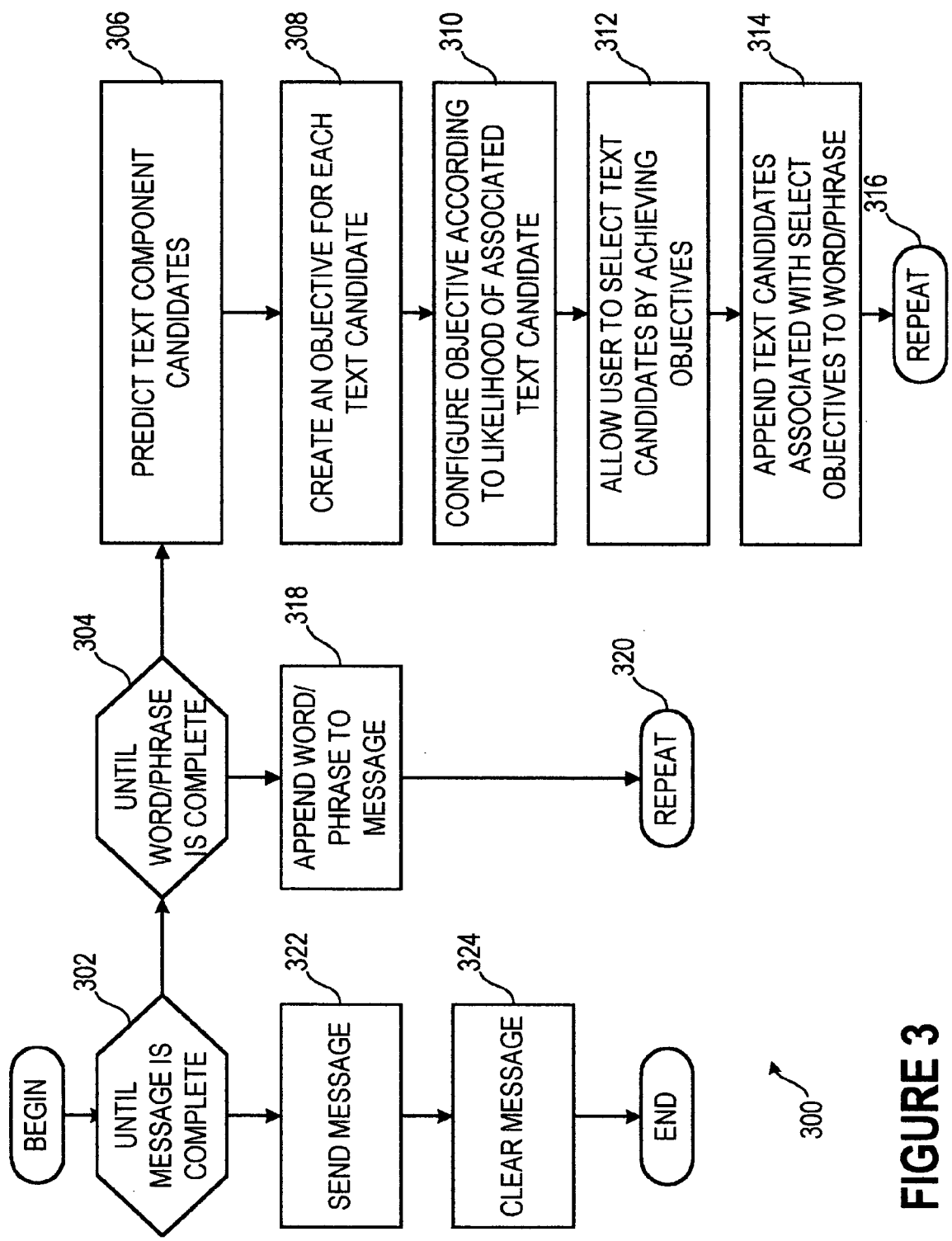
FIG. 3 is a logic flow diagram of the message composition technique implemented by the computer of FIGS. 1 and 2 in accordance with the present invention.

The manner in which message composer 220 implements user-controlled message composition is illustrated by logic flow diagram 300 (FIG. 3). Loop step 302 and step 320 define a loop in which each word of a message intended to be entered by the user is processed according to steps 304–318. In each iteration of the loop of steps 302–320, the particular word of the message being processed is sometimes referred to as the subject word.

Loop step 304 and step 316 define a loop in which each component of the subject word is processed according to steps 306–314. In each iteration of the loop of steps 304–316, the particular component being processed is sometimes referred to as the subject component. A component can be any part of a message entered by the user including, for example, letters, groups of multiple letters, syllables, words for automatic completion of the subject word, and phrases for automatic completion of the subject word and automatic inclusion of additional subsequent words.

In step 306, message composer 220 (FIG. 2) requests that prediction engine 226 provide candidate message components with associated relative likelihoods of being selected by the user. In response, prediction engine 226 determines possible candidate message components in the manner described above and ranks those message candidates in descending order of likelihood of selection by the user. In an alternative embodiment, prediction engine 226 can also provide a quantified likelihood of selection by the user. In the first iteration of the loop of steps 302–320, there are no previously entered characters or words of the message being composed. In subsequent iterations, prediction engine 226 uses previously entered characters and/or words of the message being composed to predict candidate message components according to the context of the partially formed message.

Message composer 220 provides the candidate message components and associated relative likelihoods of selection by the user to game engine 224. In step 308 (FIG. 3), game engine 224 (FIG. 2) creates objectives, e.g., objectives 508, with which message components can be associated. The objectives are create in accordance with a video game environment, sometimes referred to as the subject video game environment. In the illustrative example of screen view 502 (FIG. 5), objectives 508 are futuristic soldiers in a first-person shooter video game environment.

In step 310 (FIG. 3), game engine 224 (FIG. 2) configures the objectives according to respective likelihoods of selection for respective associated message components. As described above, objectives 508 have associated characteristics such as their location within screen view 502 and the duration of association of a particular message component with each objective 508. Game engine 224 selects candidate message components and selects other characteristics, such as which objective 508 and the duration of association, according to respective likelihoods of selection. For example, more likely candidates are associated with closer objectives 508 more often and for longer durations than are less likely candidates.

In step 312 (FIG. 3), game engine 224 (FIG. 2) receives user-generated input signals by which the user selects specific ones of the associated objectives. Game engine 224 determines selection of an objective using conventional video game techniques. For example, in the context of screen view 402 (FIG. 4), game engine 224 controls virtual flight of rocket 406 through a virtual three-dimensional space and controls virtual trajectories of virtual weapons in accordance with the user's physical manipulation of a user input device such as game controller 106. Game engine 224 (FIG. 2) also compares the virtual trajectories to virtual positions of letters 408 and word 410 to determine if a letter or word is hit by a virtual weapon. Since the entire environment is virtual and controlled by game engine 224, game engine 224 is able to determine whether a particular objective is successfully selected by the user.

In the context of screen view 502 (FIG. 5), game engine 224 also controls the entire virtual environment, including a virtual gun 506 and virtual soldiers as objectives 508 and their relative orientation, and is similarly readily able to determine if a virtual bullet hits a virtual soldier in a fatal manner to determine whether the user has selected the particular objective 508. In some embodiments, merely wounding any of objectives 508 both selects that objective 508 and freezes association of a word 512 or character 510 such that the user can select the associated message component again. Thus, a user can enter "www" by wounding an objective associated with the letter "w" twice before killing the associated objective. While it may be particularly entertaining for game engine 224 to simulate obliteration of a limb upon mere wounding of any of objectives 508, such might inhibit the emphasis of a word or thought by replicating the same character extensively as is popular in currently used text messaging systems. For example, a user might compose a message such as "You are sooooooooooooooooo lucky!" to elongate and emphasize the word, "so." In a preferred embodiment, enough of each objective 508 should remain after being wounded that the user can compose such elongated words by repeatedly wounding that objective without killing the objective.

In step 314, game engine 224 (FIG. 2) reports to message composer 220 which message component has been selected by the user and message composer 220 appends the selected message component to the message being composed. Thus, as the user achieves objectives, e.g., by shooting, flying through, driving over, etc. those objectives, associated message components are incorporated into the subject message and the subject message is updated as shown as messages 404 and 504 in respective screen views 402 and 502. If the selected message component is a single character, the character is appended to the subject word. If the selected message component is a word or phrase, the word or phrase is interpreted by message composer 220 to be completion of the subject word.

After step 314, processing transfers through step 316 to loop step 304 in which steps 306–314 are repeated until the subject word is complete. The user is provided with a user interface mechanism by which the user can indicate that the subject word is completed. One such mechanism already described is selection of a word, e.g., word 410, as a word-completion message component. In addition, pressing of a predetermined button on game controller 106 (FIG. 1) can indicate a complete word has been entered. Yet another user interface mechanism by which a user can indicate a completed word is to include non-alphanumeric characters in the candidate message components from which the user can select and such non-alphanumeric characters can include punctuation, including a space character which delimits complete words.

Upon indication by the user that the subject word is complete, processing transfers from loop step 304 to step 318 in which message composer 220 appends the completed word or phrase the the subject message.

After step 318, processing transfers through step 320 to loop step 302 in which the next word of the message intended by the user is processed in the manner described above. Game engine 312 also provides a mechanism by which the user can indicate that the intended message is completely specified and accurately represented, e.g., as message 404 in screen view 402. Such a user interface mechanism can be a designated button on game controller 106 (FIG. 1), for example.

When the user has indicated that the message is complete, processing transfers from loop step 302 to step 322 in which message composer 220 passes the completed message to message delivery agent 222. Message delivery agent 222 sends the message through Internet 108 to a recipient designated by the user. The recipient can be designated in any of a number of manners. The recipient can be implicitly identified as the sender of a message to which the user is replying or can be the particular opponent a game recently or currently played by the user. The user can also select from a list of known contacts using a video game paradigm in the manner described above with respect to message components.

In step 324, message composer 220 clears the message such that a new message can be specified subsequently.

The above description is illustrative only and is not limiting. Therefore, this description is merely illustrative, and the present invention is defined solely by the claims which follow and their full range of equivalents.

What is claimed is:

1. A method for creating a message from signals generated by a user, the method comprising:
    determining two or more message component candidates;
    determining a relative likelihood of selection by the user of each respective one of the message component candidates;
    associating each of the message component candidates with a respect objective in an interactive game environment which simulates a three-dimensional game space;
    receiving the signals generated by the user in accordance with the game environment;
    determining that the signals represent achievement of a selected one of the objectives within the interactive game environment; and
    including the one of the message component candidates which is associated with the selected objective in the message.

2. The method of claim 1 wherein the message component candidates include individual character message component candidates.

3. The method of claim 1 wherein the message component candidates include whole-word message component candidates.

4. The method of claim 1 wherein the message component candidates include multiple-word phrase message component candidates.

5. The method of claim 1 wherein associating comprises:
    associating each of the message component candidates with the respective objective according to the respective relative likelihood of selection of the message component candidate.

6. The method of claim 5 wherein each objective has a virtual location in the simulated game space which is mapped to a location in a display viewable by the user.

7. The method of claim 6 wherein association of the message components with the respective objectives is weighted such that message component candidates with higher relative likelihoods of selection tend to be associated more frequently with respective objectives whose virtual locations are mapped to a more accessible region of the display.

8. The method of claim 7 wherein the more accessible region includes the center of the display and excludes the perimeter of the display.

9. The method of claim 8 wherein the more accessible region includes more of the display to the right of center than to the left of the center.

10. The method of claim 8 wherein the more accessible region includes more of the display above center than below center.

11. The method of claim 7 wherein the more accessible region is mapped from a virtual location which is within a predetermined proximity of a virtual location of the user in the simulated game space.

12. The method of claim 5 wherein association of the message components with the respective objectives is weighted such that message component candidates with higher relative likelihoods of selection tend to be associated more frequently with respective objectives.

13. The method of claim 5 wherein association of the message components with the respective objectives is weighted such that message component candidates with higher relative likelihoods of selection tend to be associated more frequently with respective objectives for longer durations of time.

14. The method of claim 1 wherein determining that the signals represent achievement of a selected one of the objectives within the interactive game environment comprises:
   determining that the signals represent firing of a simulated weapon within the interactive game space in such a manner that the simulated weapon hits the selected one of the objectives within the interactive game environment.

15. The method of claim 1 wherein determining that the signals represent achievement of a selected one of the objectives within the interactive game environment comprises:
   determining that the signals represent navigation of a simulated vehicle within the interactive game space in such a manner that the simulated vehicle collides with the selected one of the objectives within the interactive game environment.

16. A computer readable medium useful in association with a computer which includes a processor and a memory, the computer readable medium including computer instructions which are configured to cause the computer to create a message from signals generated by a user by:
   determining two or more message component candidates;
   determining a relative likelihood of selection by the user of each respective one of the message component candidates;
   associating each of the message component candidates with a respect objective in an interactive game environment which simulates a three-dimensional game space;
   receiving the signals generated by the user in accordance with the game environment;
   determining that the signals represent achievement of a selected one of the objectives within the interactive game environment; and
   including the one of the message component candidates which is associated with the selected objective in the message.

17. The computer readable medium of claim 16 wherein the message component candidates include individual character message component candidates.

18. The computer readable medium of claim 16 wherein the message component candidates include whole-word message component candidates.

19. The computer readable medium of claim 16 wherein the message component candidates include multiple-word phrase message component candidates.

20. The computer readable medium of claim 16 wherein associating comprises:
   associating each of the message component candidates with the respective objective according to the respective relative likelihood of selection of the message component candidate.

21. The computer readable medium of claim 20 wherein each objective has a virtual location in the simulated game space which is mapped to a location in a display viewable by the user.

22. The computer readable medium of claim 21 wherein association of the message components with the respective objectives is weighted such that message component candidates with higher relative likelihoods of selection tend to be associated more frequently with respective objectives whose virtual locations are mapped to a more accessible region of the display.

23. The computer readable medium of claim 22 wherein the more accessible region includes the center of the display and excludes the perimeter of the display.

24. The computer readable medium of claim 23 wherein the more accessible region includes more of the display to the right of center than to the left of the center.

25. The computer readable medium of claim 23 wherein the more accessible region includes more of the display above center than below center.

26. The computer readable medium of claim 22 wherein the more accessible region is mapped from a virtual location which is within a predetermined proximity of a virtual location of the user in the simulated game space.

27. The computer readable medium of claim 20 wherein association of the message components with the respective objectives is weighted such that message component candidates with higher relative likelihoods of selection tend to be associated more frequently with respective objectives.

28. The computer readable medium of claim 20 wherein association of the message components with the respective objectives is weighted such that message component candidates with higher relative likelihoods of selection tend to be associated more frequently with respective objectives for longer durations of time.

29. The computer readable medium of claim 16 wherein determining that the signals represent achievement of a selected one of the objectives within the interactive game environment comprises:
   determining that the signals represent firing of a simulated weapon within the interactive game space in such a manner that the simulated weapon hits the selected one of the objectives within the interactive game environment.

30. The computer readable medium of claim 16 wherein determining that the signals represent achievement of a selected one of the objectives within the interactive game environment comprises:
   determining that the signals represent navigation of a simulated vehicle within the interactive game space in such a manner that the simulated vehicle collides with the selected one of the objectives within the interactive game environment.

31. A computer system comprising:
   a processor;
   a memory operatively coupled to the processor; and
   a message entry module (i) which executes in the processor from the memory and (ii) which, when executed by the processor, causes the computer to create a message from signals generated by a user by:
      determining two or more message component candidates;
      determining a relative likelihood of selection by the user of each respective one of the message component candidates;
      associating each of the message component candidates with a respect objective in an interactive game environment which simulates a three-dimensional game space;
      receiving the signals generated by the user in accordance with the game environment;
      determining that the signals represent achievement of a selected one of the objectives within the interactive game environment; and
      including the one of the message component candidates which is associated with the selected objective in the message.

32. The computer system of claim 31 wherein the message component candidates include individual character message component candidates.

33. The computer system of claim 31 wherein the message component candidates include whole-word message component candidates.

34. The computer system of claim 31 wherein the message component candidates include multiple-word phrase message component candidates.

35. The computer system of claim 31 wherein associating comprises:
   associating each of the message component candidates with the respective objective according to the respective relative likelihood of selection of the message component candidate.

36. The computer system of claim 35 wherein each objective has a virtual location in the simulated game space which is mapped to a location in a display viewable by the user.

37. The computer system of claim 36 wherein association of the message components with the respective objectives is weighted such that message component candidates with higher relative likelihoods of selection tend to be associated more frequently with respective objectives whose virtual locations are mapped to a more accessible region of the display.

38. The computer system of claim 37 wherein the more accessible region includes the center of the display and excludes the perimeter of the display.

39. The computer system of claim 38 wherein the more accessible region includes more of the display to the right of center than to the left of the center.

40. The computer system of claim 38 wherein the more accessible region includes more of the display above center than below center.

41. The computer system of claim 37 wherein the more accessible region is mapped from a virtual location which is within a predetermined proximity of a virtual location of the user in the simulated game space.

42. The computer system of claim 35 wherein association of the message components with the respective objectives is weighted such that message component candidates with higher relative likelihoods of selection tend to be associated more frequently with respective objectives.

43. The computer system of claim 35 wherein association of the message components with the respective objectives is weighted such that message component candidates with higher relative likelihoods of selection tend to be associated more frequently with respective objectives for longer durations of time.

44. The computer system of claim 31 wherein determining that the signals represent achievement of a selected one of the objectives within the interactive game environment comprises:
   determining that the signals represent firing of a simulated weapon within the interactive game space in such a manner that the simulated weapon hits the selected one of the objectives within the interactive game environment.

45. The computer system of claim 31 wherein determining that the signals represent achievement of a selected one of the objectives within the interactive game environment comprises:
   determining that the signals represent navigation of a simulated vehicle within the interactive game space in such a manner that the simulated vehicle collides with the selected one of the objectives within the interactive game environment.

* * * * *